Figure 1:
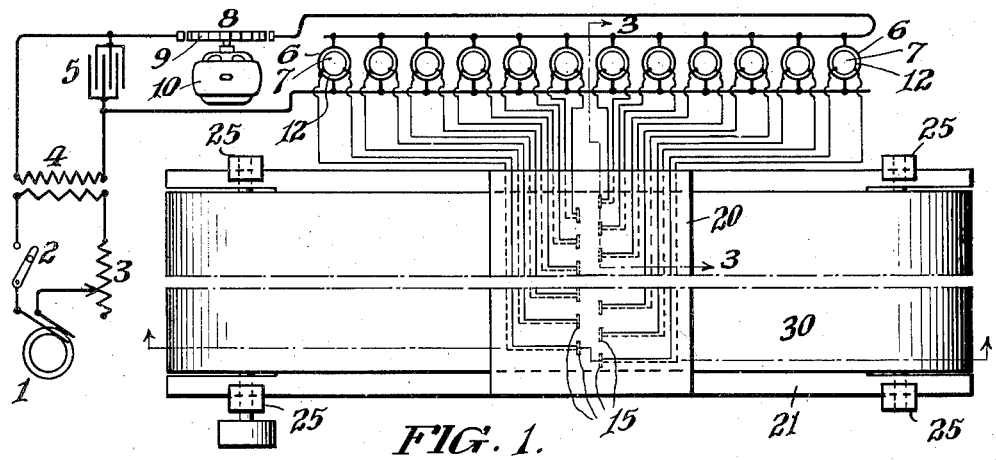

F. S. SMITH.
ELECTRICAL APPARATUS FOR DESTROYING INSECTS.
APPLICATION FILED JAN. 7, 1911.

1,016,449.

Patented Feb. 6, 1912.

2 SHEETS—SHEET 1.

Witnesses
Daniel Webster, Jr.
Carrie E. Kleinfelder.

Inventor
Franklin S. Smith
By Cyrus N. Anderson
Attorney

F. S. SMITH.
ELECTRICAL APPARATUS FOR DESTROYING INSECTS.
APPLICATION FILED JAN. 7, 1911.

1,016,449.

Patented Feb. 6, 1912.

2 SHEETS—SHEET 2.

Witnesses
Daniel Webster, Jr.
Carrie E. Kleinfelder.

Inventor
Franklin S. Smith
By Cyrus N. Anderson
Attorney

UNITED STATES PATENT OFFICE.

FRANKLIN S. SMITH, OF PHILADELPHIA, PENNSYLVANIA.

ELECTRICAL APPARATUS FOR DESTROYING INSECTS.

1,016,449.   Specification of Letters Patent.   Patented Feb. 6, 1912.

Application filed January 7, 1911. Serial No. 601,283.

*To all whom it may concern:*

Be it known that I, FRANKLIN S. SMITH, a citizen of the United States, residing in the city and county of Philadelphia, State of Pennsylvania, have invented a certain new and useful Electrical Apparatus for Destroying Insects, of which the following is a specification.

My invention relates to electrical apparatus for destroying insects and it has for its object to cause the destruction of insects by the employment of electrical discharges to the action of which the insects are subjected. The insects which it is particularly desired to destroy are those which are destructive in various ways and which destroy articles of various kinds and cause great loss of and injury to property.

Preferably I employ apparatus in which discharges are caused by oscillating currents (of either high or low frequency), but it should be understood that a uni-directional current may be employed.

Without attempting to enumerate all of the various articles and objects which may be treated for the purpose of destroying the destructive insects which infest and may destroy them, I may mention food products, such as cereals, prepared breakfast foods of the various kinds, dried fruits, flour, figs, etc.; tobacco, either in the leaf state or after it has been converted into some form of manufactured product, such as cigars or cigarettes; wearing apparel, such as furs, woolens, etc.; and books, papers, etc. As is well known, all of these various articles may be infested and are frequently not only injured but are actually destroyed by the insects which are peculiar thereto.

There is a species of worm, more apt to be found in the warmer countries, commonly called the book worm, which attacks books, papers, etc., and causes great injury and damage thereto.

The principle of my invention also may be applied and employed for the purpose of destroying the various insects which attack fruit and other trees and cause their blight and frequent death.

Employment of my invention is not limited to the objects and articles designated above but it may be employed for the treatment of many others not named for the destruction of such insects as may infest them and cause their deterioration and destruction.

In order that the apparatus embodying my invention, whatever its form of construction, may accomplish the best results, it is necessary generally that the objects and articles treated shall be free from metallic substances, though there are some cases which form an exception to this rule.

The objects and articles to be treated are placed within and subjected to the action of electrical discharges and if there should be present any metallic substances they would act as isolated capacities and would cause a condensation of the electrical current which passes through the objects or articles and thus prevent contact of the current with certain portions of the object or article being treated, with the result that the material located in proximity to such metallic substances would be unaffected and unacted upon by the discharge current through the article or object being treated.

Cereals and breakfast foods generally may be treated in bulk or in the usual cardboard boxes in which they are sold but when treated in such boxes care must be taken to prevent the presence of metal upon the said boxes. Also cigars and cigarettes may be treated in bulk or in the boxes in which they are sold or marketed. The difficulty, however, in treating cigars and cigarettes in boxes as suggested is that such boxes usually are provided with decoration which includes a greater or less amount of metallic substance which would interfere with the successful operation of my invention and discovery in the treatment of cigars in boxes; hence, cigars and cigarettes preferably should be treated in bulk and before being placed in the boxes in which they are marketed. In the treatment of clothing, care must be exercised to prevent the presence of metallic buttons because if such buttons are present they act as conductors, as already indicated, and cause a concentration of the current at the points where they are located so as to prevent the action of the current upon the portions of the material of the garment which are in proximity to and surround the said buttons.

In the employment of apparatus embodying my invention in the treatment of articles, such as are above suggested, care must be exercised to prevent their oxidation and carbonization by the use of discharge sparks which are of too great a capacity. The capacity of the sparks may be controlled in various ways and by experience it has been found that sparks may be produced and employed in the carrying out and practicing of my invention which are of sufficient capacity to destroy the insects, their eggs, larvæ or pupæ, which may be upon the articles treated but which will not cause injury to the articles themselves.

In the large number of experiments which I have heretofore carried out in the development of my invention, I have discovered that when carefully and intelligently employed and operated, my invention will destroy all of the insects in whatever stage of their development, whether as eggs, larvæ, pupæ or adults, which may infest or be present in or upon the articles or objects treated.

A few of the arrangements of apparatus for producing electrical discharges and which include convenient means for the treating of infested objects and articles, are shown diagrammatically in the several figures of the accompanying drawings to which reference may be had for a full and complete understanding of my invention and discovery and the manner of its use and operation.

Figure 2:
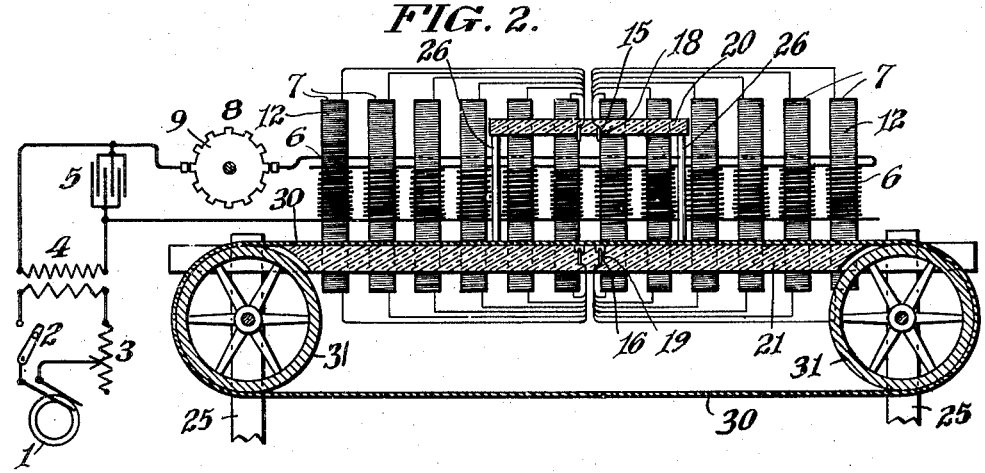
Figure 3:
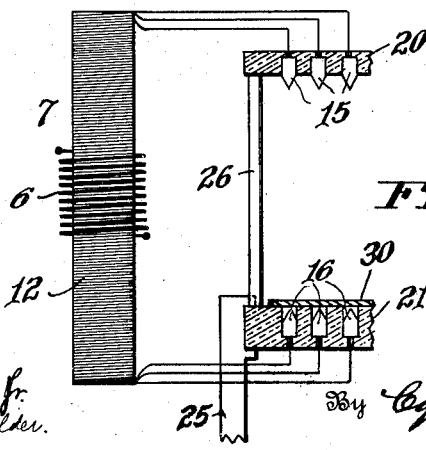
Figure 4:
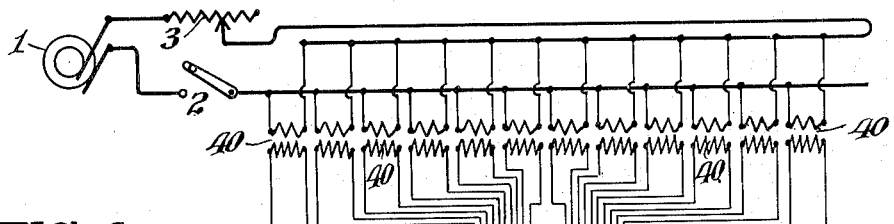

In the drawings:—Figure 1 is a top plan view of an apparatus embodying my invention; Fig. 2 is a sectional side elevation of the same; Fig. 3 is an enlarged view on the line 3—3 of Fig. 1, showing more clearly a detail of construction; Fig. 4 is a top plan view of a modified construction of apparatus embodying my invention; and Fig. 5 is a sectional side elevation of the construction shown in Fig. 4.

Referring to the drawings:—the numeral 1 designates a source of alternating electric current; 2 a switch; and 3 a variable or adjustable resistance.

In Figs. 1 to 3 inclusive the resistance 3 is connected in series with the primary of a step-up transformer 4. The condenser 5 is connected in parallel with the secondary coil of the transformer 4. The primary coils 6 of the Tesla coils 7 are connected in multiple with the condenser 5, and the spark gap, of known construction, and designated as a whole by the reference numeral 8, is connected in series with the condenser 5 and the Tesla coils 7. The revoluble member 9 of the spark gap is rotated by means of a motor 10. The opposite ends of the secondary coils 12 of the Tesla coils are connected to oppositely disposed electrodes 15 and 16. These electrodes are arranged in two rows, as is indicated in Fig. 1 of the drawings, the electrodes in the two upper rows being arranged in staggered relation with respect to each other, as is clearly shown in Fig. 1 of the drawings, while those in the two lower rows are arranged in staggered relation with respect to each other in the same manner. The number of Tesla coils and the number of electrodes and arrangement of the latter, may be varied as desired. Preferably, though in some cases it may be found to be unnecessary, the electrodes should respectively terminate in a single point in order that all portions of the object or article being treated, whether in boxes or otherwise, may be subjected to the action of the discharge. It has been found that if electrodes of considerable length and respectively provided with a plurality of points are employed and articles are treated in boxes, it happens that the discharge takes place between points of opposing electrodes which are nearest to alinement with a side of the said boxes along the said side so that the material in the boxes may not be acted upon. In such cases the insects or their eggs, larvæ or pupæ which may be present in the articles and which it is desired to destroy remain unaffected. The electrodes are supported in depressions or seats 18 and 19 formed in the plates 20 and 21 of insulating material, such as glass or porcelain. It will be understood that when the switch 2 is closed electric discharges take place between the electrodes 15 and 16 such discharges consisting of well defined sparks and also of what is known as effluve, both of which are visibly apparent. The plates 20 and 21 of insulating material are supported in any suitable manner, as for instance, upon posts or standards 25 and 26. It will be observed that the electrodes 15 project a short distance below the lower side or surface of the plate 20 while the ends of the electrodes 16 are located a short distance below the upper side of the plate 21. 30 designates a conveyer of suitable insulating material supported upon revoluble wheels 31 driven from any suitable source of power, by means of which articles to be treated are conveyed into and across the space between the electrodes 15 and 16. The electrodes in the respective rows should be arranged close together and those in the respective plates upon which they are supported should be in staggered relation with respect to each other, as indicated in Fig. 1. It is desirable that the electrodes should be arranged closely together and in staggered relation, as illustrated, in order that as an article is passed between the electrodes upon the conveyer 30 or by any other means supported intermediate the electrodes, all parts thereof should be subjected to the action of the discharge. In other words, there should be no wide gaps in the line or curtain of discharge through which an article or portions of an article might be passed without being acted upon thereby.

Figure 5:
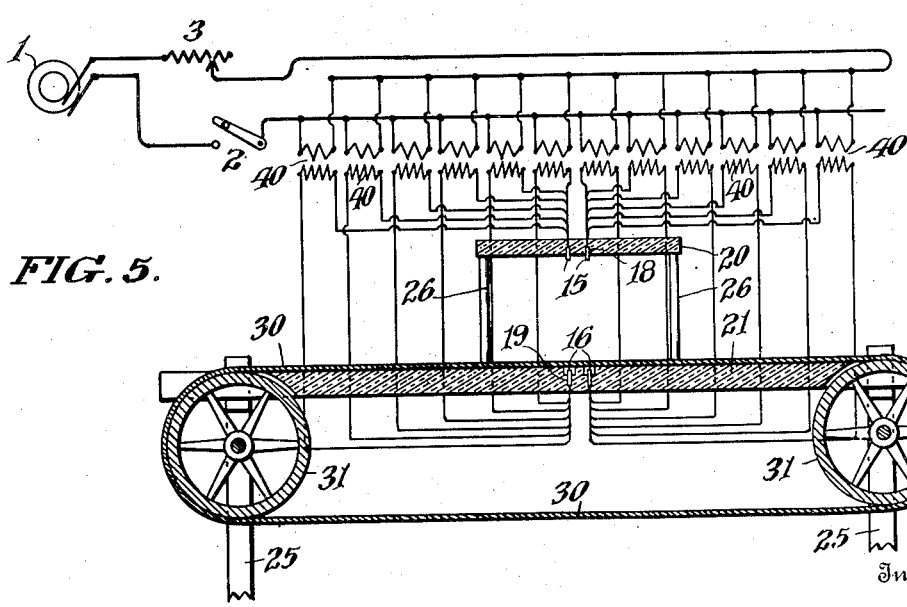

In Figs. 4 and 5 the variable or adjustable resistance 3 is connected in series with the primary coils of a number of step-up transformers 40 which are connected in multiple with the source 1 of current. The opposite ends of the secondary coils of the said transformers 40 are connected with the electrodes 15 and 16 supported and arranged in seats 18 and 19 formed in the insulating plates 20 and 21 in the same manner as is indicated in Figs. 1 to 3. The said insulating plates are supported upon posts or standards 25 and 26 in the same manner as the corresponding plates in Figs. 1 to 3 and the articles and objects are conveyed into and supported in position to be treated by means of a conveyer of insulating material 30 supported on revoluble wheels 31 driven from any suitable source of power (not shown).

It may be noted that the construction illustrated in Figs. 1 to 3 produces high frequency electrical oscillations mounting into the thousands per second, while that shown in Figs. 4 and 5 produces low frequency electrical oscillations of commercial or slightly higher high frequency. In both forms of construction as illustrated, the discharges are produced by means of electrical oscillations but it will be understood that the same result may be effected by the employment of discharges produced by a uni-directional current.

The manner of rectifying the current produced by an apparatus such as is shown in Figs. 4 and 5 so as to produce a uni-directional current is well known and need not be described herein.

In order to operate the apparatus illustrated in Figs. 1 to 3 of the drawings, the switch 2 should be closed and the motor 9 started. The variable or adjustable resistance 3 should then be so adjusted that there is no arcing of the current at the spark gap 8. The capacity of the spark between the electrodes may be varied by varying the capacity of the condenser and also to some extent by adjusting the resistance 3.

In order to operate the apparatus illustrated in Figs. 4 and 5 the switch 2 should be closed and the variable or adjustable resistance 3 adjusted as desired. In this form of construction the capacity of the discharge spark may be controlled to some extent by adjusting the resistance 3 but it is principally dependent upon the transformers 40.

It may be noted here that to secure the best results the distance between the electrodes 15 and the surface of the top portion of the conveyer or other supporting means should be only slightly greater than the height or thickness of the objects or articles which are being treated in the apparatus. As the articles being treated are placed in position in the space between the electrodes they are acted upon by the electrical discharges which take place between the said electrodes, the passage of which through the objects effects or causes the destruction and killing of the insects, their eggs, larvæ or pupæ which may be present.

In the treatment of tobacco in and by the apparatus herein before described, whichever of the illustrated forms and modifications is used, and whether the tobacco be in the form of cigars or in bundles prior to being converted into a manufactured product or in any other form, the leaves of the tobacco should be placed in the machine or apparatus for treatment so that they extend substantially in parallel relation with the direction of the lines of discharge of the electric sparks between the opposing electrodes. For instance, if cigars are treated they should be supported with their ends upon the conveying belt or other supporting means by which they are sustained in position between the electrodes for treatment. By so arranging the tobacco the current acts upon all parts of the leaves which may be included within a package and thus effectively destroys the insects, their eggs, larvæ or pupæ, as the case may be; whereas, if the tobacco is so placed that the lines of discharge take place transversely of the leaves the said discharges are apt to pass directly therethrough without spreading over their surfaces and in consequence are not likely to destroy all of the insects. It is also the case that if the discharge takes place transversely of the leaves of the tobacco it is likely that the latter would be carbonized.

In the treatment of tobacco in an apparatus of the character illustrated, discharges having very small capacities or energies should be employed so as to obviate any possibility of oxidizing and carbonizing or otherwise injuring the tobacco; but in the treatment of other substances less easily carbonized, such as cereals, the capacity or energy of the discharges may be increased without danger of causing oxidation and carbonization. It is also necessary in both forms of machine or apparatus shown that the voltage should be adjusted or varied to correspond with the capacity or conductivity of the article being treated. For instance, the voltage necessary to treat successfully a column of tobacco of a certain definite height should be less than that employed in the treatment of a column of the same height of some other substance, for instance a cereal of less conductivity. I have found that in the treatment of tobacco the combined length of the sparks between the opposing electrodes should be equal to about one-third of the distance across the space between the same because when the tobacco is placed in position for treatment it acts as a conductor so that the sparks will then extend along the tobacco clear across the space. But in the treatment of other substances of less conductivity and less capacity than tobacco, it is necessary that a voltage be employed which will occasion the projection of sparks of greater length than is necessary when tobacco is being treated, in order that when such substances are placed in position to be treated the sparks will extend entirely across the space occupied thereby. When treating cereals, for instance, the sparks should extend substantially entirely across the space between the electrodes before the cereals are placed in position to be treated.

In the drawings I have illustrated the discharges as taking place along vertical lines. It will be understood, however, that if desired both forms of apparatus shown may be provided with additional electrodes so arranged as to cause the projection of discharges in other directions, as, for instance, along horizontal lines, so as to provide for a more positive assurance that each and every part of the article being treated is subjected to the action of the discharges. However, it should be further understood, that in the treatment of tobacco the discharges should not be directed transversely of the leaves thereof for the reasons hereinbefore stated.

In the forms of construction illustrated, it is apparent that the electrodes are so arranged that the discharge produced forms substantially a curtain, so that if an article or object is passed between the electrodes every part thereof is subjected to the action of the discharge and all of the insects, their eggs, larvæ or pupæ are destroyed. I have discovered that said insects, etc., are killed immediately by the said sparks and I have discovered also that the said sparks seek out the said insects, eggs, larvæ or pupæ, wherever they may be in the package and destroy them.

The term "electrode" or "electrodes" employed herein is not one of limitation but of description and includes any terminal, as for instance the ends of the secondary coil, from which electrical discharges take place.

Having thus explained the nature of my said invention and described some of the ways of making and using the same although without attempting to set forth all of the forms in which it may be made or all the modes of its use, what I claim is:—

1. In an apparatus for destroying insects, their eggs, larvæ or pupæ, the combination of groups of electrically independent electrodes arranged in opposite relation with respect to each other and the electrodes in said groups being disposed in pairs in independent circuits, means for causing electric discharges between the said oppositely disposed electrodes and means for supporting such insects, their eggs, larvæ or pupæ between the said electrodes whereby the said insects may be destroyed.

2. In an apparatus for destroying insects, their eggs, larvæ or pupæ, the combination of means for producing high frequency electrical oscillations, thereby causing electric discharges, the said means including groups of two or more electrodes or terminals arranged in opposite relation to each other, those in each group being electrically independent of each other and in independent circuits, and means consisting of non-conducting material for conveying the said insects, their eggs, larvæ or pupæ across and through the field of said oscillations.

3. In an apparatus for destroying the insects, their eggs, larvæ or pupæ which infest various articles as set forth, the combination of two separate groups of electrodes arranged in opposite relation with respect to each other, the electrodes in each group being arranged in staggered relation with respect to each other and those in each group being electrically independent of each other and being situated in separate and independent circuits, and means for causing electric discharges between the said electrodes for destroying the insects, their eggs, larvæ or pupæ which may be placed between the same.

4. In an apparatus for destroying the insects, their eggs, larvæ or pupæ which may infest various articles as set forth, the combination of a plurality of groups of electrically-independent electrodes arranged in a plurality of independent circuits and in opposite relation with respect to each other, the electrodes in one group being arranged in staggered relation with respect to each other, means for causing electrical discharges between the said groups of independent electrodes, and means for supporting the said articles between the said electrodes whereby the insects, their eggs, larvæ or pupæ which may be therein or thereon may be subjected to the action of the said discharges and destroyed.

5. In an apparatus for destroying the insects, their eggs, larvæ or pupæ which may infest various articles as set forth, the combination of a plurality of groups of electrically independent electrodes arranged in a plurality of independent circuits in opposite relation with respect to each other, the electrodes in one group being arranged in staggered relation with respect to each other, means for causing electrical discharges between the said groups of independent electrodes, and means consisting of a non-conductor of electricity for supporting said articles between the said electrodes whereby the insects, their eggs, larvæ or pupæ which may be therein or thereon may be subjected to the action of the said discharges and destroyed.

6. In an apparatus for destroying insects, their eggs, larvæ or pupæ which may infest various articles as set forth, the combination of a plurality of groups of electrically independent electrodes arranged in opposite relation with respect to each other and in pairs in independent circuits, the electrodes in each group being staggered with respect to each other, means for causing electric discharges between the said groups of independent electrodes and a conveyer consisting of non-conducting material for conveying and supporting the said articles into and across the space between the said groups of electrodes whereby the said insects, their eggs, larvæ or pupæ which may be therein or thereon may be subjected to the action of the said discharges and thereby destroyed.

7. In an apparatus for destroying insects, their eggs, larvæ or pupæ, which may infest various articles as set forth, the combination of a plurality of groups of electrically independent electrodes in independent circuits and arranged in opposite relation with respect to each other, the electrodes in each group being arranged in rows and those in one row arranged in staggered relation with respect to those in the other row, means for causing electric discharges between the said groups of independent electrodes and means for supporting said articles in the space between the said electrodes whereby the said insects, their eggs, larvæ or pupæ which may be therein or thereon may be subjected to the action of said discharges and thereby destroyed.

8. In an apparatus for destroying insects, their eggs, larvæ or pupæ, which may infest various articles as set forth, the combination of a source of electrical energy, Tesla coils having connection therewith, groups of oppositely disposed electrodes arranged in pairs in the secondary circuits of the said Tesla coils and each of the said pairs of electrodes and the secondary circuit in which it is located being electrically independent of each other pair and the circuit in which it is located, and means for supporting such insects, their eggs, larvæ or pupæ within the space between the said groups of electrodes whereby the said insects, their eggs, larvæ or pupæ, may be subjected to the action of the sparks or discharges and thereby destroyed.

9. In an apparatus for destroying insects, their eggs, larvæ, or pupæ, the combination of a source of electrical energy, Tesla coils having connection therewith, groups of oppositely disposed electrodes arranged in pairs in the secondary circuits of the said Tesla coils and each of the said pairs of electrodes and the secondary circuit in which it is located being electrically independent of each other pair and the circuit in which it is located, means for controlling the energy of the sparks between the said electrodes, and means for supporting such insects, their eggs, larvæ or pupæ within the space between the said electrodes whereby the said insects, etc., may be subjected to the action of the sparks or discharges and thereby destroyed.

10. In an apparatus of the character described, the combination of a source of alternating electric current, a plurality of Tesla coils, a plurality of electrodes, pairs of which are supplied by the secondary circuits of the Tesla coils, each pair of electrodes and each secondary circuit supplying said pair being electrically independent of every other pair and secondary circuits supplying it, and means for supporting articles between said electrodes.

11. In apparatus of the character described, the combination of a source of alternating electric current, a plurality of Tesla coils, a condenser interposed between said Tesla coils and said source of alternating current, a plurality of oppositely arranged electrodes having electrical connection in pairs with said Tesla coils and each pair and the Tesla coil connected thereto being electrically independent of each of the other pairs of electrodes and Tesla coils connected thereto, and means for supporting articles between said electrodes.

12. In apparatus of the character described, the combination of a source of alternating electric current, a plurality of Tesla coils, a condenser interposed between said Tesla coils and said source of alternating current, a plurality of electrodes in oppositely arranged groups having electrical connection in pairs with said Tesla coils and each pair and the Tesla coil connected thereto being electrically independent of each of the other pairs of electrodes and Tesla coils connected thereto, the electrodes in each group being in staggered relation with respect to each other, and means for supporting articles between said groups of electrodes.

13. In apparatus of the character described, the combination of a source of electric current, a plurality of Tesla coils, a condenser interposed between said Tesla coils and said source of electric current, a plurality of electrodes in oppositely arranged groups having electrical connection in pairs with said Tesla coils and each pair and the Tesla coil connected thereto being electrically independent of each of the other pairs of electrodes and Tesla coils connected thereto, the electrodes in each group being in staggered relation with respect to each other, and means for supporting articles between said groups of electrodes.

14. In an apparatus of the character described, the combination of a source of electric current, a plurality of separate devices for generating induced currents, a plurality of electrodes oppositely disposed with respect to each other, in electrically independent pairs and each pair having connection with a different one of the said devices, and means for supporting articles between the said electrodes.

15. In an apparatus of the character described, the combination of a source of electric current, a plurality of separate and independent electrodes arranged in groups oppositely disposed with respect to each other, a plurality of separate means for generating induced currents each of which means is operatively connected to the said source of electric current and each of which is also operatively connected to a pair of oppositely disposed electrodes, and means for supporting articles to be treated between the said oppositely disposed groups of electrodes.

16. In an apparatus of the character described, the combination of a plurality of electrodes arranged in groups oppositely disposed with respect to each other in pairs each of which pairs is electrically independent of the other with means for causing electric discharges between the electrodes in the said groups.

17. In an apparatus of the character described, the combination of a plurality of separate sources of high tension electrical energy, a plurality of electrodes arranged in electrically independent pairs in opposite relation with respect to each other, each of which pairs has connection with a separate source of electrical energy, and means for supporting articles between said electrodes.

In testimony that I claim the foregoing as my invention, I have hereunto signed my name this 4th day of January, A. D. 1911.

FRANKLIN S. SMITH.

In the presence of—
 GEO. H. WEIDNER,
 CARRIE E. KLEINFELDER.